(12) United States Patent
Easttom, II

(10) Patent No.: US 8,713,067 B1
(45) Date of Patent: Apr. 29, 2014

(54) STABLE FILE SYSTEM

(75) Inventor: William Charles Easttom, II, McKinney, TX (US)

(73) Assignee: Open Invention Network, LLC, Durham, NC (US)

( * ) Notice: Subject to any disclaimer, the term of this patent is extended or adjusted under 35 U.S.C. 154(b) by 10 days.

(21) Appl. No.: 13/179,216

(22) Filed: Jul. 8, 2011

Related U.S. Application Data

(60) Provisional application No. 61/362,839, filed on Jul. 9, 2010.

(51) Int. Cl.
*G06F 7/00* (2006.01)
*G06F 17/30* (2006.01)

(52) U.S. Cl.
USPC ........................................................ 707/800

(58) Field of Classification Search
USPC ........................................................ 707/800
See application file for complete search history.

(56) References Cited

U.S. PATENT DOCUMENTS

| | | | | |
|---|---|---|---|---|
| 5,371,885 A | * | 12/1994 | Letwin | 1/1 |
| 2002/0069220 A1 | * | 6/2002 | Tran | 707/503 |
| 2002/0156891 A1 | * | 10/2002 | Ulrich et al. | 709/225 |
| 2005/0144514 A1 | * | 6/2005 | Ulrich et al. | 714/6 |
| 2006/0031287 A1 | * | 2/2006 | Ulrich et al. | 709/203 |
| 2006/0041718 A1 | * | 2/2006 | Ulrich et al. | 711/114 |
| 2007/0022138 A1 | * | 1/2007 | Erasani et al. | 707/104.1 |
| 2007/0186212 A1 | * | 8/2007 | Mazzaferri et al. | 718/1 |
| 2010/0169553 A1 | * | 7/2010 | Yano et al. | 711/103 |

OTHER PUBLICATIONS

Arge, et al., "The Priority R-Tree: A Practically Efficient and Worst-Case Optimal R-Tree.", ACM Transactions on Algorithms, Mar. 1, 2008, v4 n1, ACM, New York, NY.

* cited by examiner

*Primary Examiner* — Robert Beausoliel, Jr.
*Assistant Examiner* — Nicholas Allen
(74) *Attorney, Agent, or Firm* — Haynes and Boone, LLP

(57) ABSTRACT

One or more embodiments of the present invention include a memory and a processor. The memory includes a plurality of files, a master cluster record, and an operating system. The processor is configured to execute the operating system in order to locate and load each cluster of a file. Each file includes a plurality of clusters and each cluster includes a first pointer and a second pointer. The first pointer is linked to a previous cluster of a file and second pointer is linked to a subsequent cluster of the file using a double linked list data structure.

20 Claims, 5 Drawing Sheets

300

200

205   210

STABLE FILE SYSTEM

CROSS-REFERENCE TO RELATED APPLICATIONS

This application claims the benefit of prior filed U.S. Provisional Application Ser. No. 61/362,839, filed on Jul. 9, 2010, incorporated herein by reference.

FIELD

The present invention relates to a file system and, more particularly, to a stable file system that quickly and efficiently locates and loads clusters of a file.

BACKGROUND

Generally, file allocation tables (FAT) store file locations by sector. However, FAT systems are notorious for corruption and fragmentation. New technology file system (NTFS) is another file system used by Windows®. NTFS is a journaling file system that uses an NTFS Log ($Logfile) to record metadata changes to the volume. However, file names are limited to 25 UTF-16 code words. Extended file system (EXT), currently version 4, can support volumes with sizes up to 1 exabyte and files with sizes up to 16 terabytes. However, these files systems are not stable and tend to fragment over time.

SUMMARY

Certain embodiments of the present invention may provide solutions to the problems and needs in the art that have not yet been fully identified, appreciated, or solved by current file systems.

In accordance with an embodiment of the invention, an apparatus is provided that includes memory and a processor. The memory includes a plurality of files, a master cluster record, and an operating system. The processor is configured to execute the operating system in order to locate and load each cluster of a file. Each file includes a plurality of clusters and each cluster includes a first pointer and a second pointer. The first pointer is linked to a previous cluster of a file and the second pointer is linked to a subsequent cluster of the file using a double linked list data structure.

In yet another embodiment of the invention, a computer-implemented method is provided that includes locating, in a master cluster record, a cluster of a file. The method also includes locating a second cluster of the file based on a 64-bit pointer in the cluster of the file. If a 64-bit pointer of the second cluster references another cluster, the method further includes locating the other cluster of the file. However, if the 64-bit pointer of the second cluster is empty, the method includes loading previously located clusters of the file.

In yet another embodiment of the invention, a computer program is embodied on a non-transitory computer-readable medium. The computer program causes the processor to locate, in a master cluster record, a cluster of a file and locate a second cluster of the based on a 64-bit pointer in the cluster of the first file. If a 64-bit pointer of the second cluster references another cluster, then the other cluster of the file is located. If the 64-bit pointer of the second cluster is empty, then previously located clusters of the file are loaded.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Figure 1:
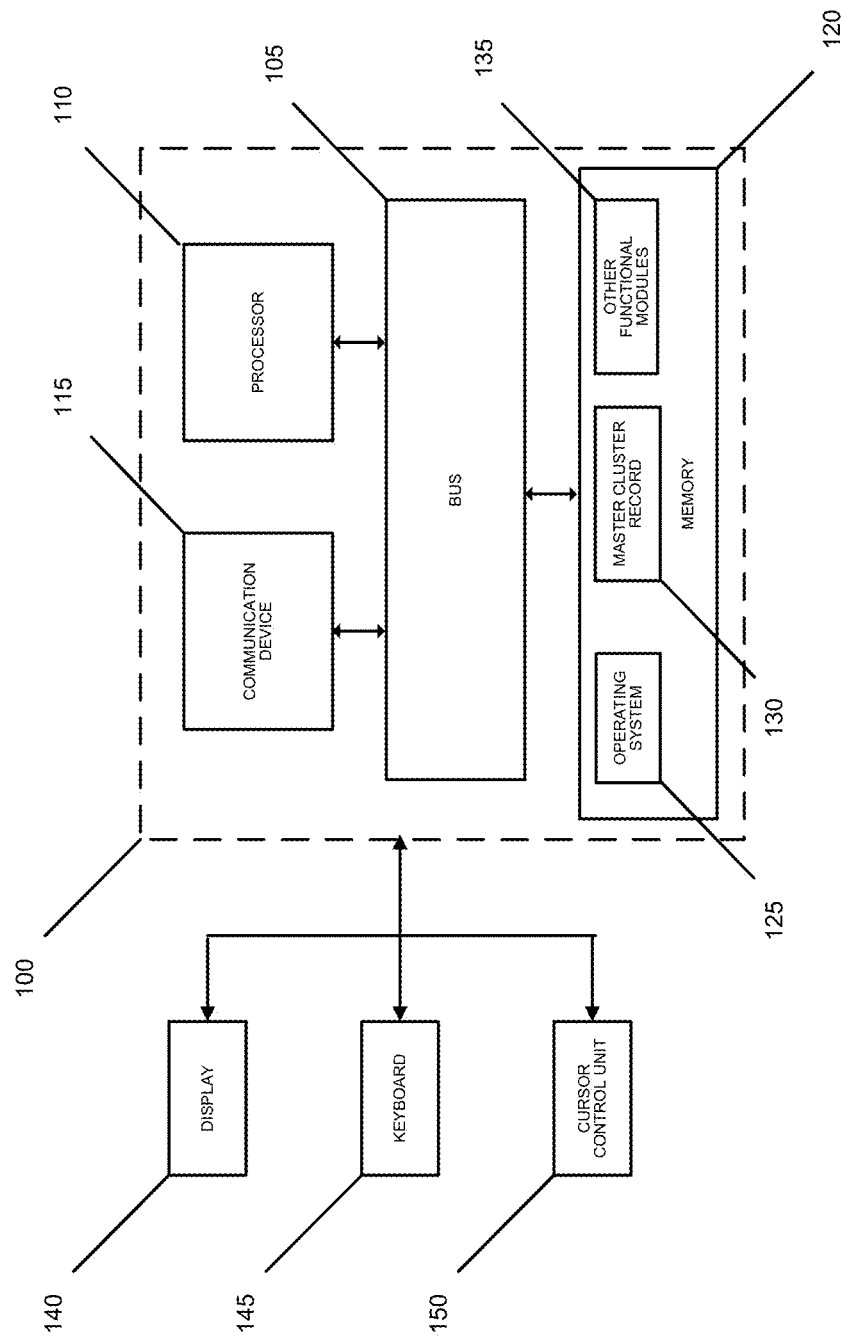
FIG. 1 illustrates a block diagram of a system that can be implemented in one or more embodiments of the present invention.

FIG. 1 illustrates a block diagram of a system 100 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 145 may display information to the user. A keyboard 150 and a cursor control unit 155, such as a computer mouse, may also be coupled to bus 105 to enable the user to interface with system 100.

According to one embodiment, memory 120 may store software modules that may provide functionality when executed by processor 110. The modules can include an operating system 125 and a master cluster record 130, as well as other functional modules 135. Operating system 125 may provide operating system functionality for system 100. Because system 100 may be part of a larger system, system 100 may include one or more additional functional modules 135 to include the additional functionality.

Figure 2:
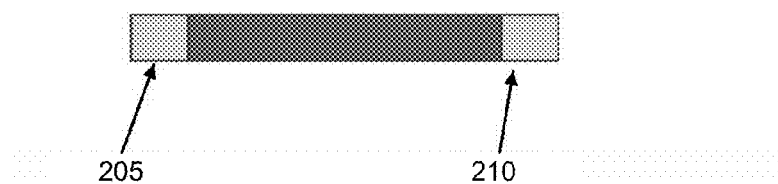
FIG. 2 illustrates a cluster, in accordance with one or more embodiments of the present invention.

FIG. 2 illustrates a cluster 200, in accordance with one or more embodiments of the present invention. Currently, all commonly used file systems include clusters. The clusters make up a file and are represented in some centralized structure (e.g., the File Table for FAT or a B+Tree for most other systems). In one or more embodiments described herein, a cluster 200 includes 64-bit pointers 205, 210 and all the clusters are linked via a double linked list. In other words, if there is more than one cluster in a file, then the 64 bit entries or pointers 205, 210 represent a previous cluster and next cluster in that file. Such a cluster architecture dramatically increases stability. Should the operating system be able to find even one cluster in a file, the rest can be found by following the double linked list chain.

Furthermore, seek time is much faster because once a single cluster is found, it points directly to the next cluster. For example, when the operating system finds the first cluster of a file, the operating system does not have to continue searching for the subsequent cluster, as each cluster points directly to the next cluster in that file. In most file systems, because each cluster is found independently in order for the file to be retrieved, the seek process for the first cluster is repeated for all clusters. However, in this embodiment, once the first cluster is located, then all the subsequent clusters are pointed to in sequence.

Figure 3:
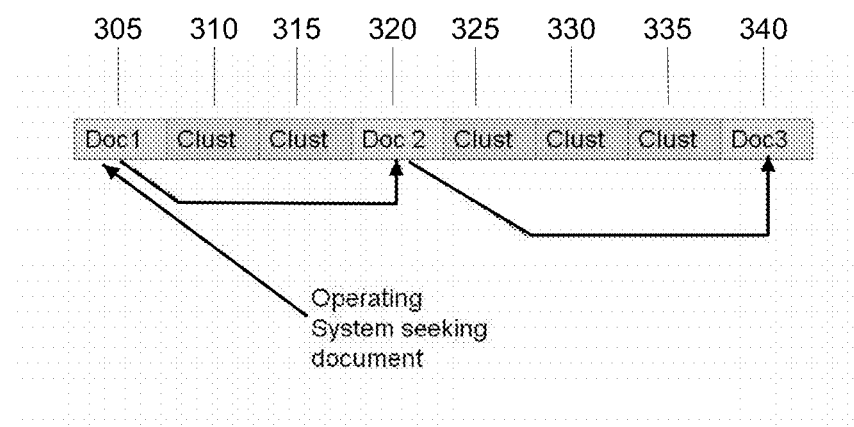
FIG. 3 illustrates a hard drive storage layout comprised of a plurality of clusters, in accordance with one or more embodiments of the invention.

FIG. 3 illustrates a hard drive storage layout 300 comprised of a plurality of clusters 305-340, in accordance with one or more embodiments of the invention. In this embodiment, if a text document occupies three (3) clusters, when the first cluster is found, the file system immediately points to the next cluster, in order. And, the next cluster in turn points to the last cluster. This allows the clusters to be located quickly, and in order.

For instance, in FIG. 3, the operating system is seeking a document represented by three clusters 305, 320, 340 (i.e., doc1, doc2, and doc3). The other clusters (simply labeled dust) 310, 315, 325, 330, 335 are just other, unrelated clusters on the hard drive. In this embodiment, once the first cluster 305 of the document is found (Doc1), then the intervening clusters are immediately skipped and the operating system goes directly to the address of the second cluster 320 of the document (Doc 2). The process is then repeated until the end of the file is found. Since each cluster has a 64 bit address pointing to the next file, seek time can be reduced.

Further, with each file pointing to the next, the issue of contiguous clusters becomes irrelevant. Because each cluster in a given file points to both the subsequent and preceding clusters in that file, the clusters perform as if they were completely defragmented regardless of the location of the clusters.

The advantage of this embodiment is that the clusters are not affected by fragmentation. In order words, the file system is immune to the problems of fragmentation. As a result, initial seek time in a new hard drive should be similar to existing systems such as NTFS and EXT.

A person of ordinary skill in the art would appreciate that the embodiments can use a double linked list as a data structure for file storage, which other file system don't use. As a result, not only is file access time decreased, but also fragmentation becomes irrelevant.

Further, this embodiment increases cluster sizes by 128 bits, since clusters range in size from 1 sector to 128 sectors. Because a sector is 512 bytes, the clusters can range in size from 512 bytes to 65 kilobytes. With single sector cluster size, the extra 128 bits would be a significant overhead. However, with clusters of 10 sectors in size, for example, the overhead of the extra 128 bits would not be a significant issue. Also, it would certainly pose no significant issue with larger cluster sizes.

However, an issue is what percentage of disk space is to be used for the head and tail pointers. When utilizing a 512-byte cluster size (i.e., 1 sector) configuration, twenty-five percent (25%) of allocated disk space can be used by pointers. A 2-sector cluster (i.e., 1024 Bytes) is also significant at 12.5%. However, because this number should generally be below 10%, a 4-sector cluster size (2048 bytes) reduces the amount of space used for pointers down to 6.2%. At the same time, abnormally large clusters can lead to wasted space since a file having a size smaller than the cluster size will still render the memory associated with that cluster as allocated, and thus unavailable for other storage. So while a person of ordinary skill in the art can appreciate that any cluster size can be used, these additional factors indicate that the system may preferably be implemented with cluster sizes between 2 and 4 sectors in some embodiments.

Furthermore, the first cluster(s) (depending on cluster size) of the drive will have a master cluster record (MCR) similar to a File Allocation Table (FAT). The MCR can provide a list of all files and the first cluster of each file. This allows the operating system to begin with the MCR entry and from the first entry, find the other clusters for a file.

In another embodiment, the double linked list can be applied to an existing file system (such as FAT32 or NTFS) and the existing file system's main file table (the File Allocation Table for FAT 32 and, in NTFS, the Master File Table) can be altered to simply point to the first cluster. In other words, existing file systems can be modified to use a double linked list while retaining other characteristics the system currently has, thus creating a hybrid file system.

In another embodiment, the MCR entries can be stored as a B-Tree or B+Tree in order to be interoperable with current operating systems. However, in a preferred embodiment, the MCR entries may be organized in a priority R Tree data structure. R Trees have been traditionally used with spatial data such as x and y coordinates. In such a system, each file location can be thought of as x and y coordinates, such as a partition/sector. Priority R Trees have had similar search speeds and insert speeds to B-Trees. It should be appreciated that by treating data as coordinates, the hard drive searches should be even faster because the seek time is decreased.

In order to read or write data in a particular place on the disk, the read/write head of the disk needs to be physically moved to the correct place. This process is known as seeking, and the time it takes for the head to move to the correct location is the seek time. Once an operating system has identified the cluster it needs for a file, the read write head has to move to that cluster. If the operating system knows not only the cluster address but also the track (or platter, or any other second coordinate implemented), then some reduction in time required to move the actuator head to that particular location on the hard drive is realized. The improvements in seek time due to the multi-coordinate system would vary from hard drive to hard drive. This can result in a slight improvement.

The Master Cluster Record or MCR serves a similar purpose to the Master File Table in NTFS. Each file's initial cluster can be found in the Master Cluster Record. However, the X,Y coordinate (i.e., the priority R Tree designation) and permissions can also be found. A person of ordinary skill in the art will readily appreciate that one can develop implementations of this embodiment to store additional information in the Master Cluster Record. Below is one example of an MCR:

| File Name (64 bit) | Address of first cluster (64 bit) | Permissions (8 bit) | X,Y coordinate (72 bit [64 bit address + 8 bit track]) |
|---|---|---|---|
| Myfile.txt | EE592E | Read only | 1:EE592E |
| Someimage.jpg | 20F6F09 | Read/Write | 4:20F6F09 |

It should be appreciated that each file entry can be 208 bits, which would be smaller than many master files for many file systems. One reason is that we only need to record the first cluster of a file, even if the file occupies many clusters. Because the other clusters in a file can be found using the double linked list, the file system's master file can include the first cluster.

Also, it should be appreciated that the X,Y coordinates denote a track and cluster. For example, "myfile.txt" is in track 1 starting at cluster EE592E, whereas "someimage.jpg" is in track 4 starting at cluster 20F6F09.

However, it should be appreciated that alternative designations for the X and Y coordinates can be used. For example, the X and Y coordinates may be partition and cluster, or track and sector. The X and Y system is faster than a B-Tree (or a B-Tree variation) because in a traditional file system, the hard drive has to spin and search for a given cluster. If the track is identified, as well as the cluster, then this makes the hard drive's search more efficient, and should decrease seek time. However, this will be a slight improvement to seek time, whereas the double linked list aspect provides a significant improvement in seek time, as well as improve stability. It should also be noted that while a Priority R Tree is the preferred method for file location designation, the double linked list aspect could also be implemented with a B-Tree variation that most current file systems use.

Hard and soft links are common in EXT file systems. The hard and/or soft link is a link or short cut to another file. In this embodiment a link would appear in the MCR as follows:

| File Name (64 bit) | Address of first cluster (64 bit) | Permissions (8 bit) | X,Y coordinate (72 bit [64 bit address + 8 bit track]) |
|---|---|---|---|
| Myfile.txt | EE592E | HardLink | 1:EE592E |
| Someimage.jpg | 20F6F09 | Soft link | 4:20F6F09 |

Journaling is a process of logging changes to the file system to assist in correcting problems or undoing some erroneous change. This exists in ReiserFS, EXT 3&4 (but not 2), and NTFS. A person of ordinary skill in the art would appreciate that it would be possible to simply add a journaling file to this embodiment and have any changes journaled.

In yet another embodiment, the file system would support file encryption. However, NTFS has very limited encryption. Every file is encrypted with the same key. In this embodiment, it would be possible to use a different key for each file, or to use the same key for many files. In order to use different keys or the same key, a public/private key encryption algorithm can be used. The public key would actually be stored with the file record and used to encrypt all clusters in that file. The private key, however, would be backed up by the user to an external device such as a USB portable drive. It should be appreciated that with the private key stored in the external device, without the external device being connected, the files cannot be decrypted. As a result, security is increased.

However, if the private key is stored in a folder on the hard drive, security would be significantly reduced. Adding file encryption to this embodiment would cause the MCR to also include encryption data, as shown below:

| File Name (64 bit) | Address of first cluster (64 bit) | Permissions (8 bit) | X,Y coordinate (72 bit [64 bit address + 30 8 bit track]) | Encrypted |
|---|---|---|---|---|
| Myfile.txt | EE592E | Read only | 1:EE592E | XyHx3300bz |
| Someimage.jpg | 20F6F09 | Read/Write | 4:20F6F09 | 0 |

The encryption column can represent either the public key for encrypting the file or a 0 indicating the file is not encrypted. It should be appreciated that when the private key is stored on an external device, the encrypted files would be inaccessible without that device attached. Such a configuration is more secure than the Windows® Encrypted File System in which the username and password form the key to decrypt files. If a user's Windows® password is compromised, then all encrypted files can be read.

In yet another embodiment, the entire hard drive could be encrypted and the key could be stored in a separate device. This would allow the entire drive to be inaccessible without the external device. Utilizing an external key would result in a more secure system than Windows® BitLocker hard drive encryption, which is also tied to a username and password.

It should also be appreciated that since both Windows® Encrypted File System and BitLocker are tied to the username and password, any method that compromises Windows® username and password also compromises and breaks that encryption. This is not the case in the embodiments described herein. For instance, even if the username and password were cracked, that would not provide the decryption key for the files and/or hard drive because the storage of the key on the external device is inherently more secure.

It should also be noted that any public key/private key encryption system could be used. Currently, RSA is the industry standard, but a person of ordinary skill in the art will readily appreciate that should a more powerful algorithm be developed, such an algorithm can also be used.

Figure 4:
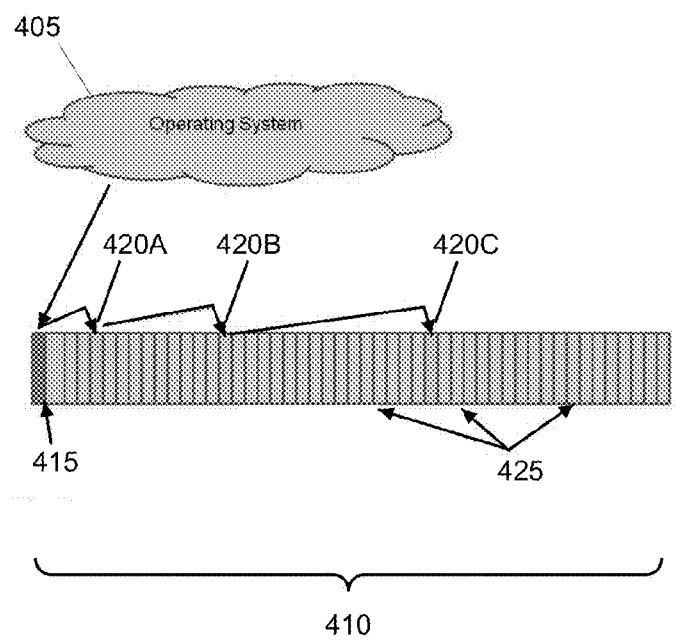
FIG. 4 illustrates an overview of the interoperation between the operating system, the file system, and the hard drive, in accordance with one or more embodiments of the present invention.

FIG. 4 illustrates an overview of the interoperation 400 between the operating system, the file system, and the hard drive, in accordance with one or more embodiments of the present invention. The hard drive 410 includes the file system, and the file system includes a plurality of clusters. In this embodiment, the first cluster 405 includes the master boot record and the master cluster record. The other clusters 420A-C represent a file, which the operating system is trying to locate and load. The remainder of the hard drive is divided into 2-4 sector clusters 425.

In this embodiment, FIG. 4 shows that the operating system 405 is configured to find a file's first cluster in the Master Cluster Record (MCR) 415. Once the first cluster 420A is found, then the operating system is directed to the next cluster 420B via the 64-bit address at the end of that cluster. Such a configuration decreases the access time of a file making the system more efficient.

Figure 5:
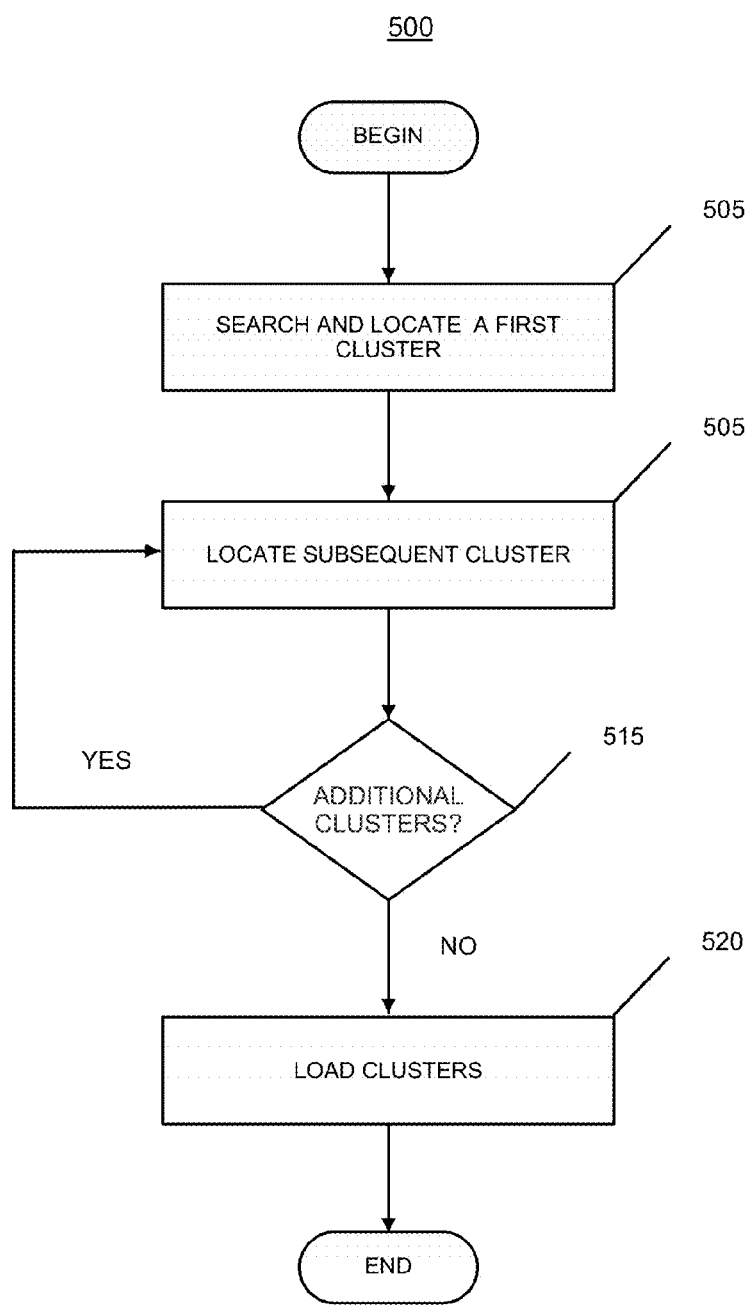
FIG. 5 illustrates a method for locating and loading clusters of a file, in accordance with one or more embodiments of the present invention.

FIG. 5 illustrates a method 500 for locating and loading clusters of a file, in accordance with one or more embodiments of the present invention. At 505, an operating system searches for a file's first cluster in the Master Cluster Record (MCR). Once the first cluster is located, the operating system at 510 locates the file's subsequent cluster using a 64-bit point at the end of the first cluster. At 515, the operating system determines if there are additional clusters in the file. If so, the process is repeated to locate the additional clusters based on the 64-bit pointer of the current cluster. This process is repeated until all the clusters are located. Once the clusters are located, the operating system at 520 loads all of the clusters in the file. Such a method significantly decreases the file access time.

The method steps shown in FIG. 5 may be performed, at least in part, by a computer program product, encoding instructions for a nonlinear adaptive processor to cause at least the method described in FIG. 5 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIG. 5, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

Given that FAT, FAT32, and NTFS all have file locations listed in a file (FAT Table or MFS file), any problem with that file yields corrupted files. EXT and other systems try to minimize this problem by having blocks that reference portions of a file. They also use a journaling system (as does NTFS) to track any changes to the hard drive volume. Other systems use a B-Tree structure, which means that it is possible to traverse the B-Tree and find a file even if the file is corrupted in the file table (MFS). However, this is time consuming and not 100% reliable.

It should be appreciated that none of the existing systems make significant improvements in this area. There is usually a trade-off between speed and file corruption countermeasures. For example, when EXT 3 introduced journaling to increase stability, the performance actually decreased from EXT 2.

Keeping the file system reliable is very critical, particularly as devices get larger. To improve reliability, EXT 4 uses checksums on the file journal. Most existing file systems use either a tree structure (such as the B-Tree) or a file table (such as FAT and the NTFS MFS file). NTFS, ReiserFS, NSS, XFS, and JFS file systems all use a B+Ttree for metadata.

The embodiments described herein provide a more stable environment via the double linked list data structure, which is inherently more stable than a B-Tree. Furthermore, the embodiments discussed herein implement the double linked list on the clusters themselves, i.e., any one cluster could be a starting point to find an entire file.

This double linked list structure makes data corruption less likely, since each cluster can 'find' the next cluster (and the previous cluster) on its own. This should also make defragmentation unnecessary as increased fragmentation will not slow down retrieval speeds. Furthermore, using a Priority R Tree should increase the speed of data retrieval. The use of x and y coordinates to locate file clusters should be faster than traversing a tree hierarchically searching for data points.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   memory comprising a plurality of files, a master cluster record, and an operating system; and
   a processor configured to execute the operating system in order to locate and load each cluster of a file,
   wherein the master cluster record comprises a list of each of the plurality of files and a first cluster for each of the plurality of files, the first cluster configured to point to a subsequent cluster of a file, and
   each of the plurality of files comprise a plurality of clusters, and each of the plurality of clusters comprise a first pointer and a second pointer, the first pointer is linked to a previous cluster of a file and second pointer is linked to a subsequent cluster of the file using a double linked list data structure.

2. The apparatus of claim 1, wherein the first pointer comprises an address of the previous cluster of the file and the second pointer comprises an address of the subsequent cluster of the file.

3. The apparatus of claim 2, wherein the processor, when executing the operating system, is configured to determine a location of a first cluster of the file in the master cluster record and, based on the second pointer of the first cluster, the processor is configured to determine a location of the subsequent cluster of the file.

4. The apparatus of claim 1, wherein each cluster comprises 128 sectors, and each sector is between 512 bytes and 65 kilobytes in size.

5. The apparatus of claim 1, wherein the master cluster record comprises a first cluster of the memory.

6. The apparatus of claim 5, wherein the master cluster record comprises first cluster information of each file stored in the memory.

7. The apparatus of claim 6, wherein the master cluster record comprises a plurality of file names, an address for a first cluster of each file, permissions for each file, and x and y coordinates for the first cluster information of each file.

8. The apparatus of claim 7, wherein the x and y coordinates identify a track and first cluster of each file.

9. The apparatus of claim 7, wherein the permissions comprise read/write permission, a hard link or soft link permission, or read/write and hard link or soft link permission.

10. The apparatus of claim 7, wherein the master cluster record comprises encryption information for each file.

11. A computer implemented method, comprising:
    locating, in a master cluster record, a first cluster of a file;
    locating a second cluster of the file based on a 64-bit pointer in the cluster of the file;
    when a 64-bit pointer of the second cluster references another cluster, locating the other cluster of the file; and
    when the 64-bit pointer of the second cluster is empty, loading previously located clusters of the file, wherein
    the master cluster record comprises a list of files and a first cluster for each of the files, the first cluster configured to point to a subsequent cluster of a file.

12. The computer implemented method of claim 11, further comprising:
    linking each cluster of the file utilizing a double linked list data structure.

13. The computer implemented method of claim 11, wherein each cluster of the file comprises a first 64-bit pointer and a second 64-bit pointer, the first 64-bit pointer represents a previous cluster of the file and the second 64-bit pointer represents a subsequent cluster of the file.

14. The computer implemented method of claim 11, wherein the master cluster record comprises a plurality of file names, an address for the first cluster of each file, permissions for each file, and x and y coordinates for the first cluster of each file.

15. The computer implemented method of claim 14, wherein the x and y coordinates identify a track and the first cluster of each file.

16. A computer program embodied on a non-transitory computer-readable medium, the computer program causing the processor to:
    locate, in a master cluster record, a first cluster of a file;
    locate a second cluster of the file based on a 64-bit pointer in the cluster of the file;
    when a 64-bit pointer of the second cluster references another cluster, locate the other cluster of the file; and
    when the 64-bit pointer of the second cluster is empty, load previously located clusters of the file, wherein
    the master cluster record comprises a list of files and a first cluster for each of the files, the first cluster configured to point to a subsequent cluster of a file.

17. The computer program of claim 16, wherein the computer program further causes the processor to:
    link each cluster of the file utilizing a double linked list.

18. The computer program of claim 16, wherein each cluster of the file comprises a first 64-bit pointer and a second 64-bit pointer, the first 64-bit pointer represents a previous cluster of the file and the second 64-bit pointer represents a subsequent cluster of the file.

19. The computer program of claim 16, wherein the master cluster record comprises a plurality of file names, an address for the first cluster of each file, permissions for each file, and x and y coordinates for the first cluster of each file.

20. The computer program of claim 19, wherein the x and y coordinates identify a track and the first cluster of each file.

\* \* \* \* \*